(12) United States Patent
Yanagida et al.

(10) Patent No.: US 7,594,491 B2
(45) Date of Patent: Sep. 29, 2009

(54) INTERNAL COMBUSTION ENGINE START CONTROLLER

(75) Inventors: Eiji Yanagida, Okazaki (JP); Eiji Sato, Nishikamo-gun (JP); Ryoji Oki, Toyota (JP); Hidenori Takahashi, Okazaki (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 194 days.

(21) Appl. No.: 11/698,077

(22) Filed: Jan. 26, 2007

(65) Prior Publication Data
US 2007/0175429 A1 Aug. 2, 2007

(30) Foreign Application Priority Data
Jan. 31, 2006 (JP) ............................. 2006-022937

(51) Int. Cl.
*F02N 11/04* (2006.01)
(52) U.S. Cl. ................................ 123/179.28
(58) Field of Classification Search ............ 123/179.28; 318/430, 471, 811
See application file for complete search history.

(56) References Cited

U.S. PATENT DOCUMENTS 6,481,406 B2 * 11/2002 Pels .................... 123/179.3
6,727,599 B2 * 4/2004 Schlangen ............... 290/40 B
7,199,540 B2 * 4/2007 Yaguchi .................. 318/432
7,205,731 B2 * 4/2007 Nagayama ............... 318/139
2002/0020381 A1 * 2/2002 Pels ...................... 123/179.3
2007/0093359 A1 * 4/2007 Kobayashi et al. ......... 477/107
2007/0296359 A1 * 12/2007 Seo et al. ................. 318/139
2008/0220932 A1 * 9/2008 Bosch et al. ............... 477/3

FOREIGN PATENT DOCUMENTS

| JP | 5-115106 A | 5/1993 |
| JP | 2002-153096 A | 5/2002 |
| JP | 2004-166341 A | 6/2004 |
| JP | 2004-183560 A | 7/2004 |
| JP | 2006-006073 A | 1/2006 |

* cited by examiner

*Primary Examiner*—Stephen K Cronin
*Assistant Examiner*—Arnold Castro
(74) *Attorney, Agent, or Firm*—Sughrue Mion, PLLC (57) ABSTRACT

An internal combustion engine start controller in a vehicle that includes: a power source; an internal combustion engine that is started by using electric power supplied from the power source; a first motor; and a first electric power converter that is constructed so as to be able to perform electric power conversion between the power source and the first motor through switching control of power semiconductor elements is provided. The start controller includes: a start detecting device for detecting whether the engine is in a starting operation; and a first frequency setting device that, when the engine is in a starting operation, sets a switching frequency of the first electric power converter to a frequency lower than that used when the engine is not in a starting operation.

15 Claims, 6 Drawing Sheets

| | HIGH ← BATTERY TEMPERATURE Tb → LOW | | | |
|---|---|---|---|---|
| | Tjd | T1 | T2 | |
| MG1 | O | O | × | × |
| MG2 | O | × | O | × |

O: NORMAL FREQUENCY (S120, fa)   × : LOW FREQUENCY (S130, fb)

FIG.8

INTERNAL COMBUSTION ENGINE START CONTROLLER

INCORPORATION BY REFERENCE

The disclosure of Japanese Patent Application No. 2006-022937 filed on Jan. 31, 2006, including the specification, drawings and abstract is incorporated herein by reference in its entirety.

BACKGROUND OF THE INVENTION

1. Field of the Invention

The present invention relates to an internal combustion engine start controller, and more particularly relates to an internal combustion engine start controller in a vehicle provided with an internal combustion engine that is started by using the electric power supplied from a power source.

2. Description of the Related Art

An internal combustion engine mounted on a vehicle is generally started by a motor (starter motor) that is driven by the electric power supplied from a power source. In particular, a configuration in which the engine is started by an AC motor that is driven and controlled by the AC voltage supplied from an inverter that is obtained through switching control of power semiconductor elements.

For example, Japanese Patent Application Publication No. 2004-183560 discloses a vehicular engine start controller in which a single AC motor starts the engine and generates electricity after the engine has been started. With this vehicular engine start controller, it is possible to reduce the number of motors as compared to a configuration including both a DC motor for starting the engine and an AC motor used only for generating electricity. In addition, because there is no fear that the commutator wears, it is possible to improve the reliability of idle-stop vehicles that involve frequent engine start-ups.

With regard to the control of the inverter for driving a motor, available are a controller that changes the carrier frequency used to control the inverter according to the temperature of power semiconductor elements (power elements) constituting the inverter (see Japanese Patent Application Publication No. 5-115106), and a voltage converter for driving and controlling an inverter by increasing the carrier frequency so as to prevent the impairment of the operational characteristics of the inverter when the atmospheric temperature drops and the counter electromotive force of the motor exceeds the withstand voltage of the inverter (see Japanese Patent Application Publication No. 2004-166341, for example).

However, because the electric power conversion performed by an inverter causes the power loss (switching loss) at the time of switching operation, there is a possibility that, during engine startup that requires a relatively large current, the required large current together with the power loss in the inverter causes power consumption to increase, and therefore causes the power source to be overloaded.

In particular, if a secondary battery is used as the power source, it becomes difficult to supply high electric power because the power density of the battery decreases under a low temperature condition. In addition, under a low temperature condition, the frictional torque in an internal combustion engine increases, and therefore, the electric power required to start the engine further increases. Consequently, there is a possibility that engine startability is impaired because the load on the power source becomes excessive and the output of the power source thus decreases. If the design margin of the power source capacity is increased in order to ensure engine startability, the size and cost of the power source can be increased.

With this regard, although Japanese Patent Application Publication No. 2004-183560 discloses a configuration in which the engine is started by the AC motor driven and controlled by an inverter, it makes no mention of how to address the problem that the load on the power source applied during engine startup increases.

Similarly, although Japanese Patent Application Publication No. 5-115106 and Japanese Patent Application Publication No. 2004-166341 disclose a control method in which the carrier frequency of an inverter is changed according to the temperature of power semiconductor elements or the atmospheric temperature, these documents make no mention of how to address the problem that the load on the power source applied during engine startup increases.

DESCRIPTION OF THE INVENTION

In consideration of the above problems, provided is a start controller that reduces the load on the power source by suppressing the power consumption during startup of an internal combustion engine in a vehicle provided with the internal combustion engine that is started by using the electric power supplied from the power source.

As an embodiment of the present invention, an internal combustion engine start controller in a vehicle that includes: a power source; an internal combustion engine that is started by using electric power supplied from the power source; a first motor; and a first electric power converter that is constructed so as to be able to perform electric power conversion between the power source and the first motor through switching control of power semiconductor elements is provided. The start controller includes: a start detecting device for detecting whether the internal combustion engine is in a starting operation; and a first frequency setting device that, when the internal combustion engine is in a starting operation, sets a switching frequency of the first electric power converter to a frequency lower than that used when the internal combustion engine is not in a starting operation.

With the internal combustion engine start controller as described above, it is possible to reduce the power loss (switching loss) by setting the switching frequency of the first electric power converter to a frequency lower than a normal frequency during startup of the internal combustion engine. In this way, it is possible to reduce the load on the power source by suppressing the power consumption during startup of the internal combustion engine. Thus, it is possible to prevent decrease in the output of the power source to improve the startability of the internal combustion engine, and it is possible to reduce the design margin of the power source capacity that is set to ensure engine startability, so that it is possible to reduce the size and cost of the power source. When the internal combustion engine is not in a starting operation but in a normal operation, by increasing the switching frequency of the electric power converter as compared to that used when the internal combustion engine is in a starting operation, it is possible to allow the motor to operate with the audible noise suppressed.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments. In the following description, the same or corresponding portions will be denoted by like reference numerals or characters, and the description thereof is not repeated in principle.

Figure 1:
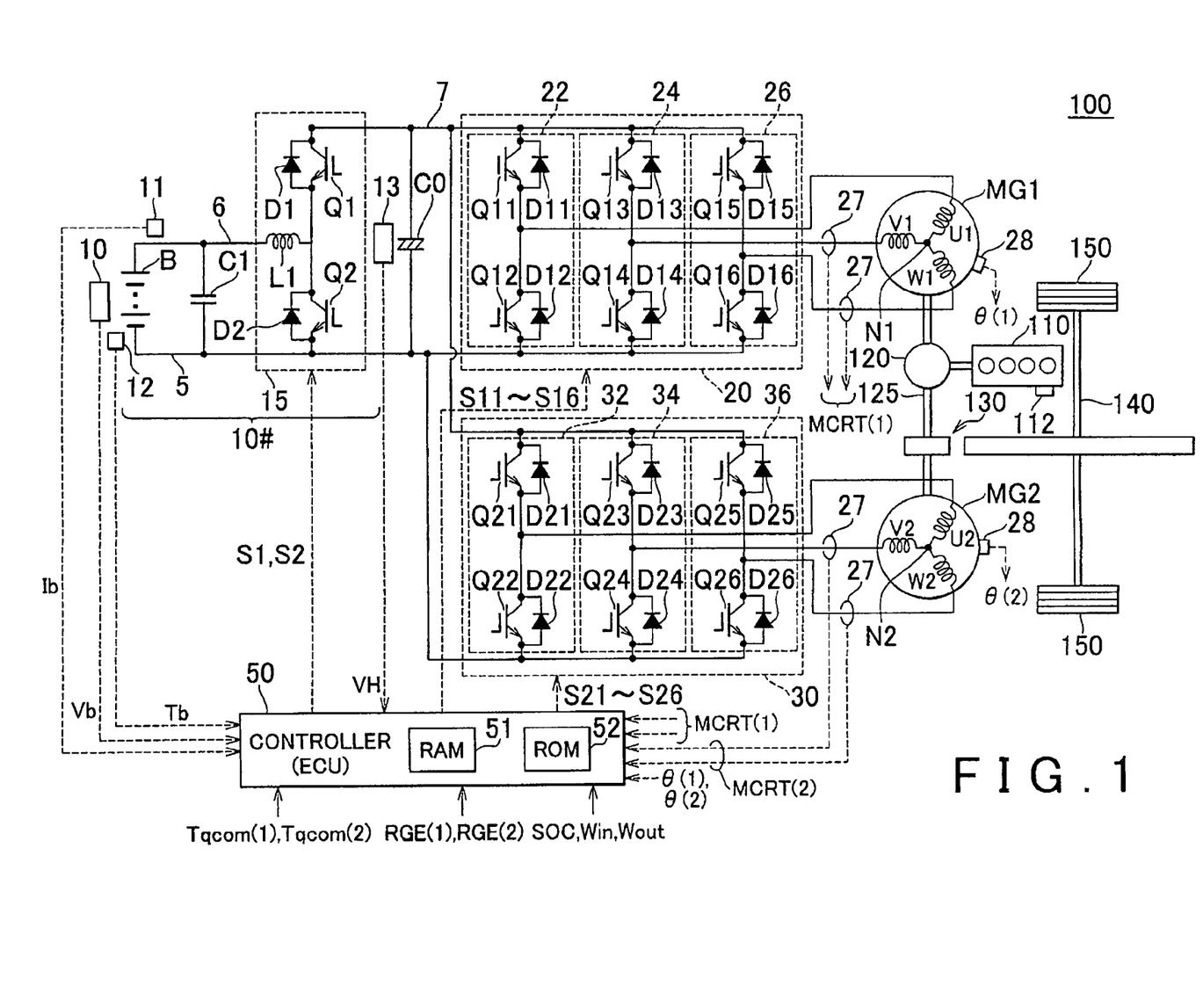
FIG. 1 is a block diagram for explaining a configuration of a hybrid vehicle shown as an example of a vehicle in which an internal combustion engine start controller according to an embodiment of the present invention is installed.

FIG. 1 is a block diagram for explaining a configuration of a hybrid vehicle 100 shown as an example of a vehicle in which an internal combustion engine start controller according to an embodiment of the present invention.

Referring to FIG. 1, the hybrid vehicle 100 includes an engine 110, a power dividing mechanism 120, motor generators MG1 and MG2 shown as examples of motors, a speed reducer 130, a drive shaft 140, and wheels (driving wheels) 150. The hybrid vehicle 100 further includes a DC voltage generator 10#, a smoothing capacitor C0, inverters 20 and 30, and a controller 50, which are used for driving and controlling the motor generators MG1 and MG2.

The engine 110 is constituted of an internal combustion engine, such as a gasoline engine and a diesel engine, for example. The engine is provided with a coolant temperature sensor 112 for detecting the temperature of coolant. The output from the coolant temperature sensor 112 is sent to the controller 50.

The power dividing mechanism 120 is constructed so as to be able to divide the power generated by the engine 110 between the path to the drive shaft 140 and the path to the motor generator MG1. As the power dividing mechanism 120, a planetary gear system having three rotary shafts for a sun gear, a carrier, and a ring gear can be used. For example, it is possible to mechanically connect the engine 110 and the motor generators MG1 and MG2 to the power dividing mechanism 120 by making the rotor of the motor generator MG1 hollow, and passing a crank shaft of the engine 110 through the center of the rotor. Specifically, the rotor of the motor generator MG1 is coupled to the sun gear, an output shaft of the engine 110 is coupled to the carrier, and an output shaft 125 is coupled to the ring gear. The output shaft 125, which is also coupled to a rotary shaft of the motor generator MG2, is connected to the drive shaft 140 for rotating the drive shaft 150 via the speed reducer 130. A speed reducer for the rotary shaft of the motor generator MG2 may be additionally incorporated.

The motor generator MG1 is constructed so as to function as a generator and a motor, more specifically, so as to act as a generator driven by the engine 110, and as a motor for starting the engine 110.

Similarly, the motor generator MG2 is installed in the hybrid vehicle 100 as a vehicle-driving-force generator of which the output is transmitted to the drive shaft 140 via the output shaft 125 and the speed reducer 130. The motor generator MG2 is constructed so as to function as a motor and a generator in such a way as to perform electricity regeneration by producing the output torque in a direction opposite to the rotational direction of the wheels 150.

Next, components used for driving and controlling the motor generators MG1 and MG2 will be described.

The DC voltage generator 10# includes a traction battery B, a smoothing capacitor C1, and a buck-boost converter 15.

A secondary battery, such as a nickel metal hydride battery or a lithium ion battery, can be used as the traction battery B. Although, in the hybrid vehicle 100, an electricity storage device, such as an electric double layer capacitor, can be used instead of the traction battery B, the configuration in which the traction battery B constituted of a secondary battery is used as the "power source" will be described below with regard to this embodiment. As described above, in the hybrid vehicle 100, the motor generator MG1 performs startup of the engine 110, using the traction battery B as the "power source". The motor generator MG2 also uses, as the power source, the traction battery B that is the "power source" used during engine startup.

A voltage sensor 10 detects the battery voltage Vb outputted by the traction battery B, and a current sensor 11 detects the battery current Ib inputted to or outputted from the traction battery B. In addition, the traction battery B is provided with a temperature sensor 12. Because there is a possibility that the temperature of the traction battery B is different depending on the portions thereof, temperature sensors 12 may be placed at a plurality of positions in the traction battery B. The battery voltage Vb, the battery current Ib and the battery temperature Tb, which are detected by the voltage sensor 10, the current sensor 11 and the temperature sensor 12, are outputted to the controller 50.

The smoothing capacitor C1 is connected between a ground line 5 and a power line 6. Relays (not shown), which are in an on state while the vehicle is activated and are in an off state while the vehicle is deactivated, are placed between the cathode terminal of the traction battery B and the power line 6, and between the anode terminal of the traction battery B and the ground terminal 5.

The buck-boost converter 15 includes a reactor L1, and power semiconductor elements (hereinafter referred to as "the switching element") Q1 and Q2, which are subject to switching control. The reactor L1 is connected between the power line 6 and a node at which the switching elements Q1 and Q2 are connected. The smoothing capacitor C0 is connected between a power line 7 and the ground line 5.

The power semiconductor switching elements Q1 and Q2 are connected in series between the power line 7 and the ground line 5. Turning on and off of the power semiconductor switching elements Q1 and Q2 is controlled by switching control signals S1 and S2 from the controller 50.

In this embodiment of the present invention, IGBTs (Insulated Gate Bipolar Transistors), power MOS (Metal Oxide Semiconductor) transistors, power bipolar transistors or the like can be used as the switching elements. Anti-parallel diodes D1 and D2 are placed for the switching elements Q1 and Q2, respectively.

The inverter 20 is constituted of a U-phase arm 22, a V-phase arm 24 and a W-phase arm 26, which are connected in parallel between the power line 7 and the ground line 5. Each arm is constituted of switching elements connected in series between the power line 7 and the ground line 5. For example, the U-phase arm 22 is constituted of switching elements Q11 and Q12; the V-phase arm, switching elements Q13 and Q14; and the W-phase arm, switching elements Q15 and Q16. Anti-parallel diodes D11 to D16 are connected across the switching elements Q11 and Q16, respectively. Turning on and off of the switching elements Q11 to Q16 is controlled by switching control signals S11 to S16 from the controller 50.

The motor generator MG1 includes a U-phase coil U1, a V-phase coil V1 and a W-phase coil W1, which are provided on a stator, as well as a rotor (not shown). One terminals of the U-phase coil U1, the V-phase coil V1 and the W-phase coil W1 are mutually connected at a neutral point N1, and the other terminals thereof are connected to the U-phase arm 22, V-phase arm 24 and the W-phase arm 26 of the inverter 20, respectively. The inverter 20 performs bidirectional electric power conversion between the DC voltage generator 10# and the motor generator MG1 by performing on/off control (switching control) of the switching elements Q11 to Q16 according to the switching control signals S11 to S16 from the controller 50.

Specifically, the inverter 20 can convert the DC voltage applied via the power line 7 to a three-phase AC voltage according to the switching control performed by the controller 50, and can output the resultant three-phase AC voltage to the motor generator MG1. In this way, the motor generator MG1 is driven so as to produce a specified torque. In addition, the inverter 20 can convert the three-phase AC voltage that the motor generator MG1 generates while receiving the output of the engine 110 to a DC voltage according to the switching control performed by the controller 50, and can output the resultant DC voltage to the power line 7.

The inverter 30, which is constructed similarly to the inverter 20, includes: switching elements Q21 to Q26 that are turned on and off according to switching control signals S21 to S26; and anti-parallel diodes D21 to D26.

The motor generator MG2, which is constructed similarly to the motor generator MG1, includes a U-phase coil U2, a V-phase coil V2 and a W-phase coil W2, which are provided on a stator, as well as a rotor (not shown). As in the case of the motor generator MG1, one terminals of the U-phase coil U2, the V-phase coil V2 and the W-phase coil W2 are mutually connected at a neutral point N2, and the other terminals thereof are connected to the U-phase arm 22, V-phase arm 24 and the W-phase arm 26 of the inverter 30, respectively.

The inverter 30 performs bidirectional electric power conversion between the DC voltage generator 10# and the motor generator MG2 by performing on/off control (switching control) of the switching elements Q21 to Q26 according to the switching control signals S21 to S26 from the controller 50.

Specifically, the inverter 30 can convert the DC voltage applied via the power line 7 to a three-phase AC voltage according to the switching control performed by the controller 50, and can output the resultant three-phase AC voltage to the motor generator MG2. In this way, the motor generator MG2 is driven so as to produce a specified torque. In addition, the inverter 30 can convert the three-phase AC voltage that the motor generator MG2 generates while receiving the rotational force applied by the wheels 150 during regenerative braking of the vehicle, to a DC voltage according to the switching control performed by the controller 50, and can output the resultant DC voltage to the power line 7.

The regenerative braking herein includes the braking accompanied by electricity regeneration that is performed when a driver driving the hybrid vehicle operates the foot brake, and deceleration of the vehicle (or stopping the acceleration thereof) by releasing the acceleration pedal while the vehicle is running, with electricity regeneration performed.

Each of the motor generators MG1 and MG2 is provided with current sensors 27 and a rotation angle sensor (resolver) 28. Because the sum of the instantaneous values of three-phase currents iu, iv and iw equals zero, it will suffice to place the current sensors 27 so as to detect the motor currents corresponding to two phases (the V-phase current iv and the W-phase current iw, for example) as shown in FIG. 1. The rotation angle sensors 28 detect the rotation angles $\theta$ of the rotors (not shown) of the motor generators MG1 and MG2, and send the detected rotation angles $\theta$ to the controller 50. The controller 50 can calculate the rotation rates Nmt (rotational angular speeds $\omega$) of the motor generators MG1 and MG2 from the rotation angles $\theta$.

The motor current MCRT(1) and the rotor rotation angle $\theta(1)$ of the motor generator MG1, as well as the motor current MCRT(2) and the rotor rotation angle $\theta(2)$ of the motor generator MG2, which are detected by the sensors, are supplied to the controller 50. In addition, the controller 50 receives the torque specifying value Tqcom(1) of the motor generator MG1 and the control signal RGE(1) indicating regenerative operation, and the torque specifying value Tqcom(2) of the motor generator MG2 and the control signal RGE(2), as motor commands.

The controller 50 constituted of an ECU (electronic control unit) includes a microcomputer (not shown), a RAM (Random Access Memory) 51, and a ROM (Read Only Memory) 52. The controller 50 generates the switching control signals S1 and S2 (for the buck-boost converter 15), S11 to S16 (for the inverter 20), and S21 to S26 (for the inverter 30) for the switching control of the buck-boost converter 15 and the inverters 20 and 30 so that the motor generators MG1 and MG2 operate in accordance with the motor commands supplied from a host ECU according to a predetermined, programmed process.

In addition, the controller 50 receives information on the traction battery B, such as the state of charge (SOC), and the amount of receivable power Win, Wout that implies limitations on charging and discharging. Thus, the controller 50 has a function of limiting the power consumption and the power generation (regenerated power) in the motor generators MG1 and MG2 if necessary so that overcharge or overdischarge of the traction battery B is prevented.

Although, in this embodiment, a mechanism for changing the switching frequency in controlling the inverter by using a single control unit (ECU) 50 is described, it is also possible to realize a similar control system with the use of the cooperative operation of a plurality of control units (ECU).

Next, the operation of the buck-boost converter 15 and the inverters 20 and 30 performed in driving and controlling the motor generators MG1 and MG2 will be explained.

While the buck-boost converter 15 performs boost operation, the controller 50 calculates the value specifying a system voltage VH according to the operational state of the motor generators MG1 and MG2, and generates the switching control signals S1 and S2 based on this specifying value and the value of the system voltage VH detected by the voltage sensor 13 so that the output voltage VH becomes equal to the voltage specifying value.

During boost operation, the buck-boost converter 15 supplies, to the inverters 20 and 30, the same DC voltage VH obtained by boosting the DC voltage (battery voltage) Vb supplied from the traction battery B (this DC voltage corresponding to the input voltage applied to the inverters 20 and 30 will hereinafter be referred to also as "the system voltage VH"). More specifically, the duty ratios (on-period ratios) of the switching elements Q1 and Q2 are set in accordance with the switching control signals S1 and S2 from the controller 50, and a boost ratio depends on the duty ratio.

During buck operation, the buck-boost converter 15 charges the traction battery B while bucking the DC voltage (system voltage) supplied from the inverters 20 and 30 via the smoothing capacitor C0. More specifically, the period during which only the switching element Q1 is in an on state and the period during which both of the switching elements Q1 and Q2 are in an off state are alternately provided in accordance with the switching control signals S1 and S2 from the controller 50, and the step-down ratio depends on the duty ratio, which is an on-period ratio.

The smoothing capacitor C0 smoothes the DC voltage supplied from the buck-boost converter 15, and supplies the smoothed DC voltage to the inverters 20 and 30. The voltage sensor 13 detects the voltage across the smoothing capacitor C0, that is, the system voltage VH, and outputs the detected value VH to the controller 50.

The inverter 30, when the torque specifying value of the corresponding motor generator MG2 is positive (Tqcom(2)>0), drives the motor generator MG2 so that the motor generator MG2 produces a positive torque by converting the DC voltage supplied from the smoothing capacitor C0 to an AC voltage through the on/off operation (switching operation) of the switching elements Q21 to Q26 according to the switching control signals S21 to S26 from the controller 50. On the other hand, the inverter 30, when the torque specifying value of the corresponding motor generator MG2 equals zero (Tqcom(2)=0), drives the motor generator MG2 so that the motor generator MG2 produces zero torque by converting the DC voltage to an AC voltage through the switching operation according to the switching control signals S21 to S26. Thus, the motor generator MG2 is driven so as to produce zero torque or a positive torque specified by the torque specifying value Tqcom.

During regenerative braking of the hybrid vehicle, the torque specifying value of the motor generator MG2 is set to a negative value (Tqcom(2)<0). In this case, the inverter 30 converts the AC voltage generated by the motor generator MG2 to a DC voltage through the switching operation according to the switching control signals S21 to S26, and supplies the resultant DC voltage (system voltage) to the buck-boost converter 15 via the smoothing capacitor C0.

The inverter 30 performs on/off control of the switching elements Q21 to Q26 according to the switching control signals S21 to S26 from the controller 50, thereby performing electric power conversion so that the motor generator MG2 operates in accordance with the specifying value. As in the case of the operation of the inverter 30, the inverter 20 performs on/off control of the switching elements Q11 to Q16 according to the switching control signals S11 to S16 from the controller 50, thereby performing electric power conversion so that the motor generator MG1 operates in accordance with the specifying value.

As described above, the controller 50 drives and controls the motor generators MG1 and MG2 in accordance with the torque specifying values Tqcom(1) and Tqcom(2), whereby the hybrid vehicle 100 can allow the motor generator MG2 to generate the vehicle driving force with the use of electric power, allow the motor generator MG1 to generate the power for charging the traction battery B or the power used by the motor generator MG2, and allow the motor generator MG2 to generate the power for charging the traction battery B through regenerative braking (electric power generation) as appropriate according to the operational state of the vehicle.

The controller 50 drives and controls the motor generators MG1 and MG2 basically by performing feedback control of the motor current MCRT as described below.

Figure 2:
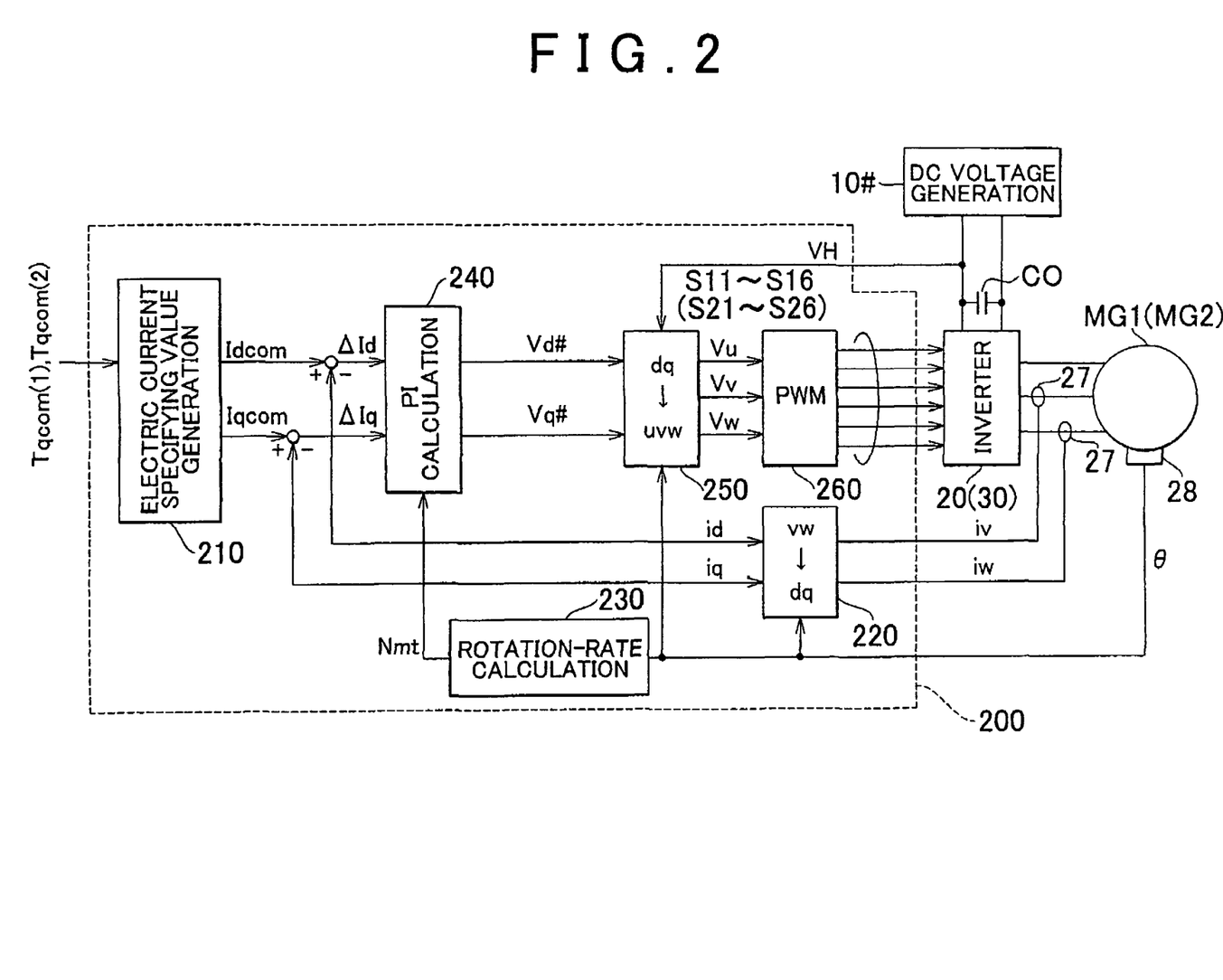
FIG. 2 is a control block diagram for explaining a motor control system in the hybrid vehicle shown in FIG. 1.

FIG. 2 is a control block diagram for explaining a configuration for controlling the motor in the hybrid vehicle 100 shown in FIG. 1.

Referring to FIG. 2, an electric current control block 200 includes an electric current specifying value generation section 210, coordinate transformation sections 220 and 250, a rotation-rate calculation section 230, a PI calculation section 240, and a PWM signal generation section 260. The electric current control block 200 shows a functional block of the controller 50, which is realized by running the program stored in advance in the controller 50 in a predetermined cycle. The electric current control block 200 is provided for each of the motor generators MG1 and MG2.

The electric current specifying value generation section 210 generates electric current specifying values Idcom and Iqcom in accordance with the torque specifying value Tqcom(1) (Tqcom(2)) of the motor generator MG1 (MG2), referring to a table or the like that is prepared in advance.

The coordinate transformation section 220 calculates the d-axis current id and the q-axis current iq based on the motor current MCRT (iv, iw, iu=(iv+iw)) detected by the current sensors 27, by performing coordinate transformation (three phases to two phases) using the rotation angle θ of the motor generator MG1 (MG2) detected by the rotation angle sensor 28 with which the motor generator MG1 (MG2) is provided. The rotation rate calculation section 230 calculates the rotation rate Nmt of the motor generator MG1 (MG2) from the output from the rotation angle sensor 28.

The PI calculation section 240 receives the deviation ΔId (ΔId=Idcom−id) from the specifying value of the d-axis current and the deviation ΔIq (ΔIq=Iqcom−iq) from the specifying value of the q-axis current. The PI calculation section 240 performs PI calculation using a predetermined gain for each of the d-axis current deviation Δid and the q-axis current deviation ΔIq to obtain the deviation, and generates a d-axis voltage specifying value Vd# and a q-axis voltage specifying value Vq# corresponding to the deviation.

The coordinate transformation section 250 transforms the d-axis voltage specifying value Vd# and the q-axis voltage specifying value Vq# into voltage specifying values Vu, Vv and Vw of the respective phases, the U phase, the V phase and the W phase by performing coordinate transformation (two phases to three phases) using the rotation angle θ of the motor generator MG1 (MG2). The transformation from the d-axis voltage specifying value Vd# and the q-axis voltage specifying value Vq# into the voltage specifying values Vu, Vv and Vw of the respective phases also reflects the DC voltage VH.

The PWM signal generation section 260 generates the switching control signals S11 to S16 (S21 to S26) of the inverter 20 (30) shown in FIG. 1, based on the comparison between a specific carrier wave and the voltage specifying values Vu, Vv and Vw of the respective phases.

When the switching control of the inverter 20 (30) is performed in accordance with the switching control signals S11 to S16 (S21 to S26) generated by the electric current control block 200, AC voltage for producing the torque corresponding to the torque specifying value Tqcom(1) (Tqcom(2)) is applied to the motor generator MG1 (MG2).

Figure 3:
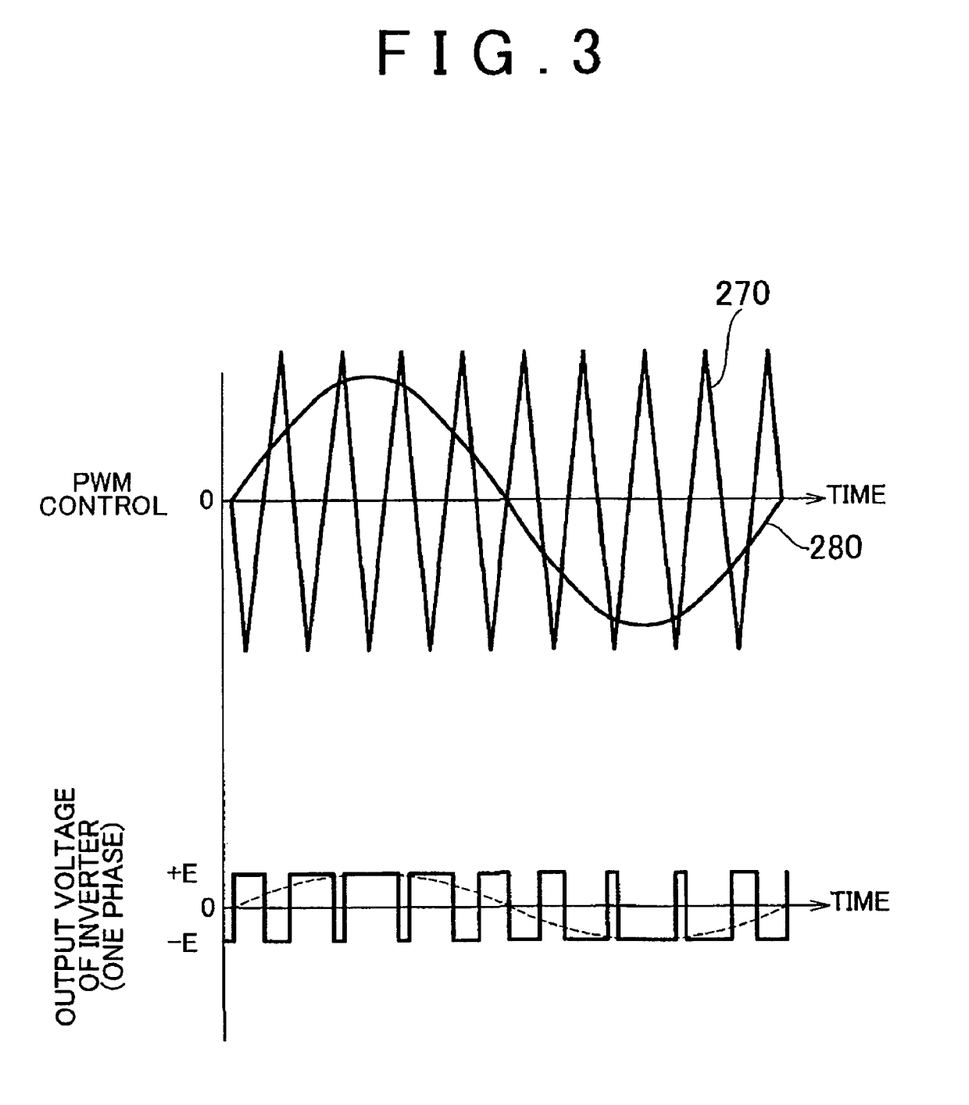
FIG. 3 is a waveform diagram for explaining pulse width modulation (PWM) control performed by a PWM signal generation section shown in FIG. 2.

FIG. 3 shows a waveform diagram for explaining the pulse width modulation (PWM) control performed by the PWM signal generation section 260.

The PWM control is a control method in which the average of the output voltage over each period is varied by changing the pulse width of the square-wave output voltage every predetermined period of time. In general, the PWM control is performed by dividing a predetermined period into a plurality of switching periods depending on the period of the carrier wave, and performing the on/off control of the power semiconductor switching elements every switching period.

Referring to FIG. 3, the PWM signal generation section 260 compares a carrier wave having a predetermined frequency with a signal wave 280 corresponding to the voltage specifying value (Vu, Vv, Vw) of each phase sent from the coordinate transformation section 250. The on/off state of the switching elements in each arm of the inverter 20 (30) is changed between the period during which the carrier wave voltage is higher than the signal wave voltage, and the period during which the signal wave voltage is higher than the carrier wave voltage, so that it is possible to supply the AC voltage, which is a series of square-wave voltage pulses, to the motor generator MG1 (MG2) as the output voltage each phase of the inverter. The dotted line in FIG. 3 shows the fundamental component of the AC voltage. Specifically, the frequency (carrier frequency) of the carrier wave 270 corresponds to the switching frequency of the switching elements constituting the inverter 20 (30).

In the embodiment of the present invention, when the engine of the hybrid vehicle 100 is in a starting operation, the frequency of the carrier wave 270 used for the PWM control of the inverter 20 (30) is controlled as described below.

Figure 4:
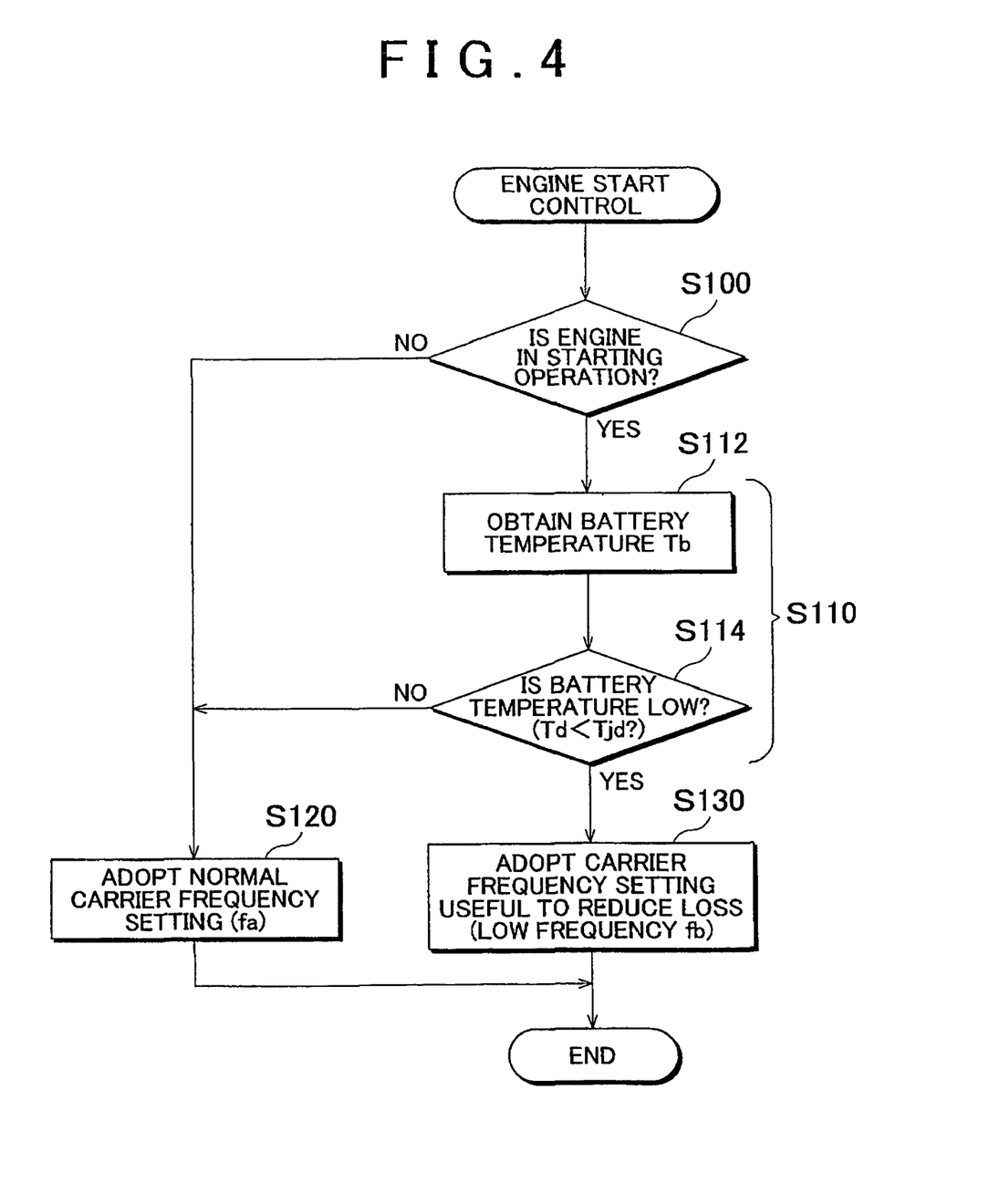
FIG. 4 is a flow chart for explaining an engine start control according to the embodiment of the present invention.

FIG. 4 is a flow chart for explaining an engine start control according to the embodiment of the present invention, which is performed by the controller 50 during engine startup.

Referring to FIG. 4, the controller 50 determines whether the engine is in a starting operation, in step S100. In step S100, the result of determination is YES from when the command to start the engine 110 is generated to when it is determined that engine startup has been completed after the rotation rate of the engine 110 reaches a predetermined rotation rate, for example.

During the engine startup (while the result of determination is YES in step S100), the controller 50 further determines whether the engine is in a low temperature state in step S110. Step 110 includes step S112 for acquiring battery temperature, and step 114 for comparing the battery temperature Tb obtained in step S112 with a reference temperature Tjd, and determines whether the traction battery B, which is the "power source," is in the low temperature state.

When the battery temperature Tb is lower than the reference temperature Tjd, that is, when Tb<Tjd (YES in step S114), the controller 50 detects the low temperature state of the power source in step S110. On the other hand, when the battery temperature Tb is equal to or higher than the reference temperature Tjd, that is, when Tb≧Tjd (NO in step S114), the low temperature state of the power source is not detected.

When the engine is not being started (NO in step S100), or when the low temperature state is not detected in step S110 (NO in step S114), the controller 50 uses a normal carrier frequency as the carrier frequency of the inverters 20 and 30 in step S120. The carrier frequency (that is, the switching frequency of the inverter) is normally set to a relatively high frequency fa (about 5 to 10 kHz, for example) so that the electromagnetic sympathetic sound that accompanies the switching operation of the inverter has a frequency beyond the audible frequency range. The setting of the normal carrier frequency may be a fixed frequency. Alternatively, the normal carrier frequency may be variably set according to the operational status (such as rotation speed and output torque) of the corresponding motor generator MG1 or MG2.

However, because the power loss of a switching element increases with the switching frequency, there is a possibility that, during engine startup that requires relatively high electric power to operate the motor generator MG1, the required high electric power together with the power loss in the inverters 20 and 30 due to such high frequency switching causes the power source to be overloaded. Therefore, decrease in the output of the power source can impair easy startability of the engine. In addition, if the design with a large margin of the power source capacity is adopted so as not to cause such decrease in the power source output, increase in size and cost of the apparatus can be brought about.

For this reason, during the engine startup, in step S130, the controller 50 sets the carrier frequency to a low frequency fb (about 1 kHz, for example) lower than a normal frequency so that the switching loss in the inverter 20 and/or the inverter 30 is reduced.

When such a low frequency fb is used, although there is apprehension that audible noise can be produced due to the switching operation in the audible frequency range, the number of times of switching the switching elements decreases, so that it is possible to inhibit the power loss. As a result, the power to be output from the power source during the engine startup is lightened, and it is possible to keep the load on the power source low.

Figure 5:
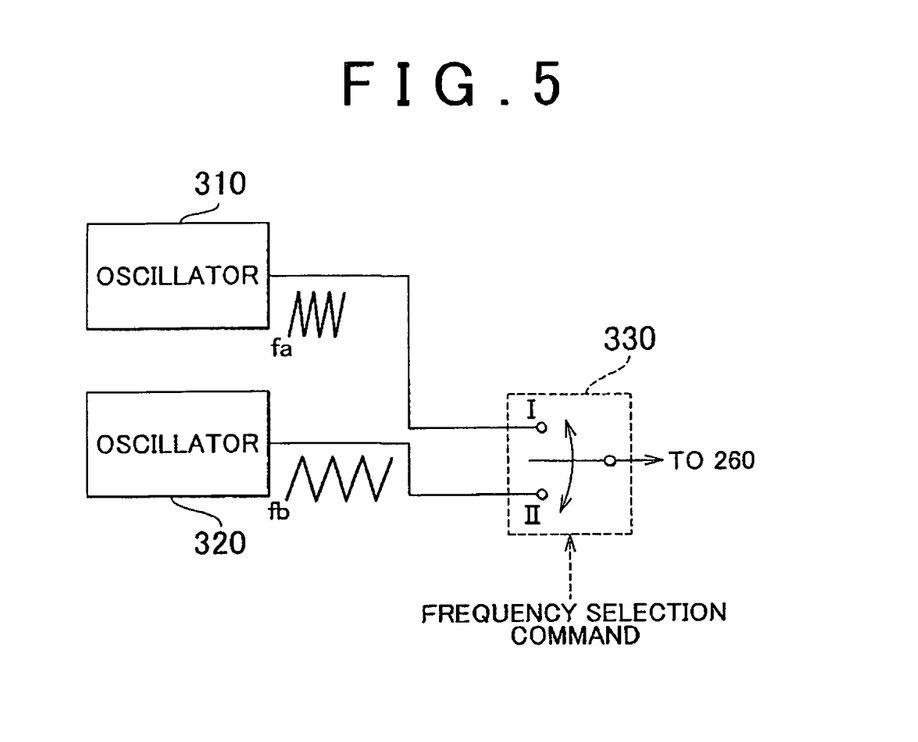
FIG. 5 is a block diagram showing a first example of a system for changing a carrier frequency.

FIG. 5 shows an example of a carrier wave generation system for changing the carrier frequency between the normal frequency fa and the low frequency fb used for reducing loss.

Referring to FIG. 5, the carrier wave generation system 300 includes an oscillator 310 for generating the carrier wave with the normal frequency fa, an oscillator 320 for generating the carrier wave with the low frequency fb (fb<fa), and a selector switch 330. The selector switch 330 connects one of the oscillators 310 and 320 to the PWM signal generation section 260 (FIG. 2) in accordance with a frequency selection command giving instruction as to which of the normal frequency fa and the low frequency fb should be selected.

When the carrier frequency is set in step S120, the controller 50 generates the frequency selection command that causes the selector switch 330 to be switched to the I-side position. In this case, the carrier wave 270 with the normal frequency fa is sent to the PWM signal generation section 260.

On the other hand, when the carrier frequency is set in step S130, the controller 50 generates the frequency selection command that causes the selector switch 330 to be switched to the II-side position. In this case, the carrier wave 270 with the low frequency fb is sent to the PWM signal generation section 260.

Alternatively, it is also possible to adopt a configuration in which a voltage-controlled oscillator is used, and the frequency of the carrier wave is changed by this single oscillator.

Figure 6:
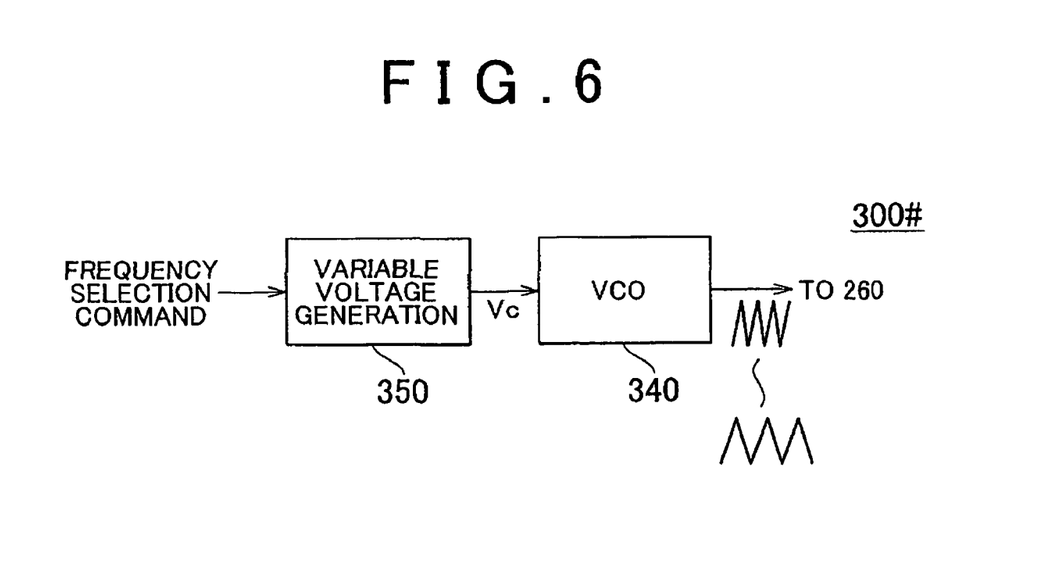
FIG. 6 is a block diagram showing a second example of a system for changing a carrier frequency.

Referring to FIG. 6, a carrier wave generation system 300# includes a voltage-controlled oscillator (VCO) 340 and a variable voltage generator 350. The VCO 340 generates the carrier wave 270 with the frequency corresponding to an input control voltage Vc, and sends the carrier wave 270 to the PWM signal generation section 260 (FIG. 2). The variable voltage generator 350 variably sets the control voltage Vc supplied to the VCO 340 in accordance with the frequency selection command similar to that of FIG. 5. The carrier wave generation system 300# of such a configuration also can change the frequency of the carrier wave 270 between the normal frequency fa and the low frequency fb in accordance with the frequency selection command.

Although the configuration in which the carrier frequency is changed between two levels, the normal frequency fa and the low frequency fb, is described in the description of this embodiment, it is possible to adopt a configuration in which the carrier frequency is selected from among a larger number of levels.

While the low temperature state is detected (YES in step 110), the load on the power source further increases due to decrease in the power density of the power source. In addition, when the temperature is low, frictional torque in the engine 110 is large, which also causes the load on the power source to increase. Accordingly, during the engine startup, especially when the power source is in a low temperature state, the necessity to reduce the load on the power source by setting the carrier frequency to the low frequency as described above is great. Accordingly, it is also advantageous to experimentally determine the reference temperature Tjd used in step S114 in accordance with the power source characteristics (dependence thereof on temperature).

Therefore, in the case where, even when the engine is in a starting operation, the load on the power source does not become excessive except when the power source is in a low temperature state, the carrier frequency can be set in step S120 if the determination result is NO (the low temperature state is not detected) in step S110 as described above. In this way, in the temperature range (in the room temperature range, for example) in which the load on the power source does not become excessive, it is possible to start the engine 110 without producing the carrier noise in the inverters 20 and 30.

On the other hand, if the output characteristics of the power source do not largely depend on temperature, it is possible to adopt a control configuration in which selection is made between the setting of the carrier frequency to the normal frequency in step S120 and the setting of the carrier frequency to the loss reducing frequency (low frequency) in step S130, based only on the determination as to whether the engine is in a starting operation. Alternatively, it is also possible to adopt a control configuration in which the state of the engine 110 is determined based on the output from the coolant temperature sensor 112, and the setting of the carrier frequency to the loss reducing frequency (step S130) is performed not when the low temperature state of the power source is detected but when the low temperature state of the engine is detected.

Figure 7:
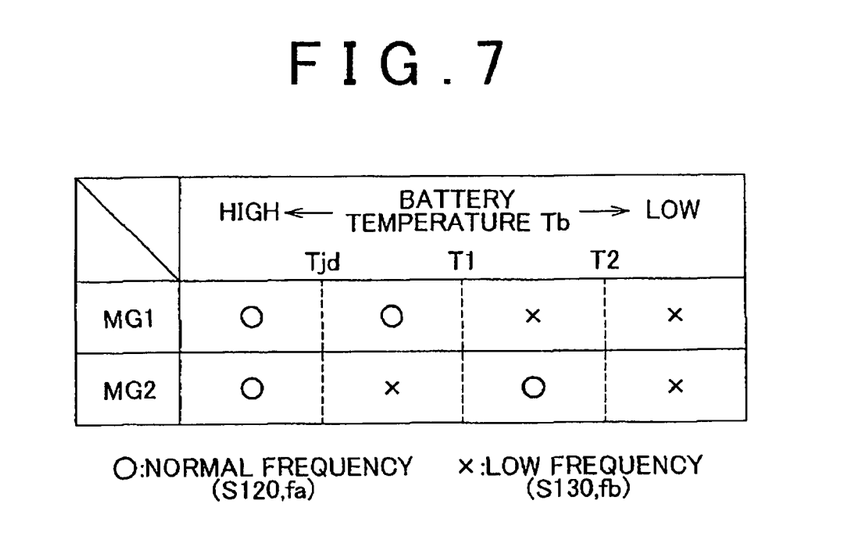
FIG. 7 is a diagram for explaining an example of control in which the carrier frequency of an inverter is variably set in accordance with the temperature of a power source.

In the case where it becomes difficult to surely obtain power output from the power source as the power source temperature (that is, the battery temperature Tb) drops as described above, it is possible to adopt a control configuration that makes it possible to select an inverter that reduces the carrier frequency depending on the battery temperature Tb as shown in FIG. 7.

Referring to FIG. 7, when the battery temperature Tb is equal to or higher than the reference temperature Tjd, the low temperature state is not detected, and the controller 50 performs the setting of the carrier frequency to the normal frequency (step S120) for both of the inverters 20 and 30, which drive and control the motor generators MG1 and MG2.

On the other hand, when the battery temperature Tb drops below the reference temperature Tjd, if Tjd>Tb≧T1, the carrier frequency setting useful to reduce loss (step S130) is adopted for the inverter (the inverter 30 in this example) corresponding to the motor generator (the motor generator MG2 in this example) that brings about a relatively little effect of reducing the power consumption by using the low carrier frequency, while the normal carrier frequency setting (step S120) is adopted for the inverter 20 corresponding to the other motor generator MG1.

If the battery temperature Tb is in a lower temperature range, that is, T1>Tb≧T2 (T2<T1), the carrier frequency setting useful to reduce loss (step S130) is adopted for the inverter (the inverter 20 in this example) corresponding to the motor generator (the motor generator MG1 in this example) that brings about a relatively much effect of reducing the power consumption by using the low carrier frequency, while the normal carrier frequency setting (step S120) is adopted for the inverter 30 corresponding to the other motor generator MG2.

If the battery temperature Tb is less than T2, the carrier frequency setting useful to reduce loss (step S130) is adopted for both of the inverters 20 and 30.

As described above, according to the engine start control according to this embodiment of the present invention, by lowering, relative to the normal frequency, the switching frequency (carrier frequency) of the inverters 20 and 30, which drive and control the motor generators MG1 and MG2, during the engine startup, it is possible to reduce the power output from the power source by reducing the power loss of the inverters 20 and 30. In this way, the load applied to the power source during the engine startup is reduced, a smooth engine startup is achieved. In addition, the design margin of the power source capacity is kept small, so that it is possible to reduce the size and cost of the power source. In particular, depending on the kind of the power source, the above effect becomes more noticeable by reducing the power loss of the inverter during the engine startup in a low temperature state in which the power density decreases.

During the engine startup, the switching frequencies of the inverters 20 and 30 are set so that the frequencies are above the audible frequency range, which makes it possible to operate the motor generators MG1 and MG2 while inhibiting the audible noise.

With regard to the configuration in which a plurality of pairs of motors and corresponding inverters are provided, by selecting the inverter that reduces the switching frequency (carrier frequency) depending on the amount of decrease in the power source temperature (battery temperature Tb), it is possible to perform the reduction of the switching frequency of the inverter that makes it possible to reduce the power loss but can possibly produce audible noise, with the extent of the reduction kept in a proper range.

Although, in FIG. 1, a hybrid vehicle of a mechanically dividing type that divides power with a planetary gear system and that is of a parallel hybrid configuration enabling both the engine 110 and the motor generator MG2 to produce the wheel driving force, is illustrated, application of the present invention is not limited to such a construction. The present invention can be applied to a hybrid vehicle of a series hybrid configuration in which the engine serves only as a power supply source of the motor and what directly drives the wheels is the motor, and to a hybrid vehicle of another hybrid configuration, typically, a hybrid vehicle of a so-called electrically dividing type, in the means for controlling the electric power converter, such as an inverter, connected to the power source that is also used as the power source for starting the engine.

The engine start control according to the above-described present invention can be applied to vehicles other than the hybrid vehicles. A modified example of the embodiment will therefore be described below. For the purpose of describing the modified example, a description will be given of application of the engine start control according to the present invention to a vehicle (hereinafter referred to as "the economy running vehicle") provided with a so-called economy running system.

Figure 8:
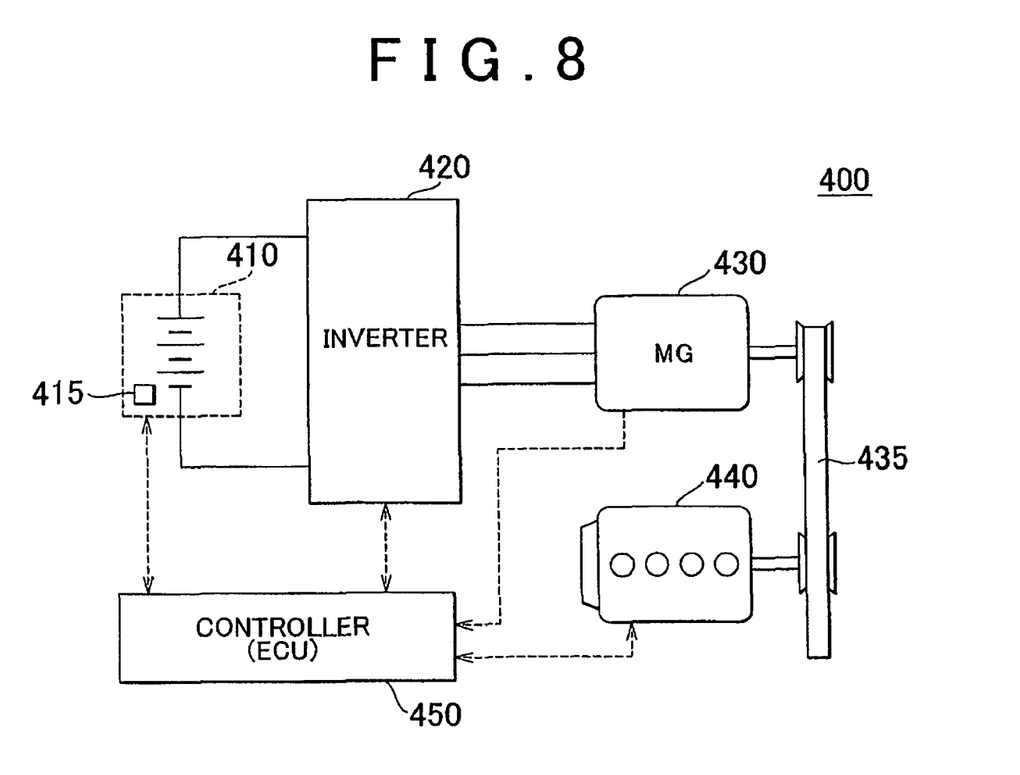
FIG. 8 is a block diagram showing an engine starting system of an automobile provided with an economy running system, according to a modified example of the embodiment of the present invention.

FIG. 8 is a block diagram showing an engine starting system for the economy running vehicle according to the modified example of the embodiment of the present invention.

Referring to FIG. 8, an engine starting system 400 according to the modified example of the embodiment of the present invention includes: a power source 410 typically constituted of a secondary battery; an inverter 420; a motor generator 430; an engine 440; and a controller 450. The controller 450 is constructed so as to be able to control actions of elements constituting the engine starting system 400.

An output shaft of the motor generator 430 is connected to the engine 440 via a connecting belt 445. As a result, the turning force produced by the motor generator 430 can start the engine 440. When the engine 440 is in operation, the motor generator 430 is rotated via the connecting belt 445, so that it is possible to cause the motor generator 430 to act as a generator to generate electricity.

The power source 410 corresponds to the traction battery B shown in FIG. 1, and it is possible to detect the battery temperature Tb by using the temperature sensor 415. The inverter 420 is placed between the power source 410 and the motor generator 430, and is constructed so as to be able to perform bidirectional electric power conversion therebetween. Thus, the inverter 420 can convert the DC power supplied from the power source 410 to the AC power used to rotate the motor generator 430 through switching control of the switching elements, and can start the engine 440. On the other hand, while the engine 440 is in operation, the inverter 420 can convert the power generated by the motor generator 430, which is rotated by the engine 440, to the DC power that can be used to charge the power source 410, through switching control of the switching elements.

The controller 450, while the engine 440 is in operation, temporarily stops the operating engine 440 automatically when a predetermined condition for automatically stopping the engine is satisfied, and, while the engine 440 is temporarily stopped, restarts the temporarily-stopped engine 440 automatically when a predetermined condition for discontinuing stopping the engine.

Typically, the condition for automatically stopping the engine is satisfied when the state where the vehicle speed equals 0 and the accelerator pedal operation amount equals 0 has remained unchanged for a predetermined period of time, and the catalyst (not shown) through which the exhaust gas from the engine 440 passes has already been activated. On the other hand, the condition for discontinuing stopping the engine corresponds to when the condition for automatically stopping the engine becomes unsatisfied, and typically corresponds to the state where the acceleration pedal is operated and the acceleration pedal operation amount becomes non-zero.

Accordingly, with the engine starting system 400, the engine 440 is temporarily stopped and restarted automatically while the vehicle is driven. The inverter 420 and the motor generator 430 are controlled as in the case of those shown in FIGS. 2 and 3, during the engine startup (including the restart thereof) during which the motor generator 430 serves as a motor, and during normal operation of the engine during which the motor generator 430 serves as a generator.

Accordingly, also in the case of the engine starting system 400, it is possible to set the switching frequency (carrier frequency) of the inverter 420 for driving the motor generator 430, based on the flow chart shown in FIG. 4.

During engine startup (restart) where the load on the power source becomes large, and especially, during engine startup (restart) under low temperature condition where the load on the power source further increases due to the decrease in the power density of the power source, by adopting such an engine start control, it is possible to reduce the power loss in the inverter 420 for controlling the motor generator 430, so that it is possible to reduce the load on the power source 410. On the other hand, it is possible to prevent audible noise from being produced, by causing the inverter 420 to operate at a normal switching frequency when the motor generator 430 serves as a generator while the engine is in operation, or during engine startup (restart) under room temperature condition.

As described in relation to FIG. 4, also in the case of the engine starting system shown in FIG. 8, if the output characteristics of the power source do not largely depend on temperature, it is possible to adopt a control configuration in which selection is made between the setting of the carrier frequency to the normal frequency and the setting of the carrier frequency to the loss reducing frequency (low frequency), based only on the determination as to whether the engine is in a starting operation. Alternatively, it is also possible to adopt a control configuration in which the setting of the carrier frequency effective to reduce loss is performed not when the low temperature state of the power source is detected but when the low temperature state of the engine is detected.

The embodiments disclosed herein are merely examples in all respects, and should be construed as non-limiting examples. The scope of the present invention is determined not by the above description but by following claims, and is intended to cover all alterations and modifications that fall within the scope of claims or the full scope of equivalents.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An internal combustion engine start controller in a vehicle that includes: a power source; an internal combustion engine that is started by using electric power supplied from the power source; a first motor; and a first electric power converter that is constructed so as to be able to perform electric power conversion between the power source and the first motor through switching control of power semiconductor elements, the controller comprising:

a start detecting device for detecting whether the engine is in a starting operation; and a first frequency setting device that, when the engine is in a starting operation, sets a switching frequency of the first electric power converter to a frequency lower than that used during normal operation;

wherein the vehicle further includes:

a second motor that is driven by using the electric power supplied from the power source and is connected to a drive shaft that is different from a shaft to that the first motor is connected; and a second electric power converter constructed so as to be able to perform electric power conversion between the power source and the second motor through switching control of the power semiconductor elements, and the start controller further comprises:

a second frequency setting device that, when the engine is in a starting operation, sets a switching frequency of the second electric power converter to a frequency lower than that used during normal operation.

2. The internal combustion engine start controller according to claim 1, wherein
the first motor is configured so as to be able to produce power for starting the engine when the engine is in a starting operation, and so as to have an operating period of time other than when the engine is in a starting operation.

3. The internal combustion engine start controller according to claim 2, wherein
the first motor is configured so as to be able to generate electricity by using a rotational force produced by the engine when the engine is in operation, and
the first electric power converter is controlled so as to convert electric power generated by the first motor to electric power with which it is possible to charge the power source.

4. The internal combustion engine start controller according to claim 3, further comprising:
a low temperature detector for detecting a low temperature state of the power source based on a detected temperature of the power source, wherein,
even when the engine is in a starting operation, if the low temperature state of the power source is not detected by the low temperature detector, the first frequency setting device sets the switching frequency of the first electric power converter to substantially the same frequency as that used when the engine is not in a starting operation.

5. The internal combustion engine start controller according to claim 4, wherein,
when the engine is in a starting operation, if the low temperature state of the power source is detected by the low temperature detector, the first frequency setting device sets the switching frequency of the first electric power converter to a frequency lower than that used in normal operation, according to the detected temperature of the power source.

6. The internal combustion engine start controller according to claim 1, further comprising:
a low temperature detector for detecting a low temperature state of the power source based on a detected temperature of the power source, wherein,
even when the engine is in a starting operation, if the low temperature state of the power source is not detected by the low temperature detector, the first frequency setting device sets the switching frequency of the first electric power converter to substantially the same frequency as that used when the engine is not in a starting operation.

7. The internal combustion engine start controller according to claim 1, further comprising:
a low temperature detector for detecting a low temperature state of the power source based on a detected temperature of the power source, wherein,
even when the engine is in a starting operation, if the low temperature state of the power source is not detected by the low temperature detector, the first and second frequency setting devices respectively set the switching frequency of the first electric power converter and the switching frequency of the second electric power converter to substantially the same frequencies as those used in normal operation.

8. The internal combustion engine start controller according to claim 7, wherein,
when the engine is in a starting operation, if the low temperature state of the power source is detected by the low temperature detector, the first and second frequency setting devices determine whether to set the switching frequency of the first electric power converter and the switching frequency of the second electric power converter, respectively, to frequencies lower than those used in normal operation, based on the detected temperature of the power source.

9. The internal combustion engine start controller according to claim 1, wherein
power output from the second motor is transmitted to the drive shaft of the vehicle.

10. The internal combustion engine start controller according to claim 9, further comprising:
a low temperature detector for detecting a low temperature state of the power source based on a detected temperature of the power source, wherein,
even when the engine is in a starting operation, if the low temperature state of the power source is not detected by the low temperature detector, the first and second frequency setting devices respectively set the switching frequency of the first electric power converter and the switching frequency of the second electric power converter to substantially the same frequencies as those used in normal operation.

11. The internal combustion engine start controller according to claim 10, wherein
when the engine is in a starting operation, if the low temperature state of the power source is detected by the low temperature detector, the first and second frequency setting devices determine whether to set the switching frequency of the first electric power converter and the switching frequency of the second electric power converter, respectively, to frequencies lower than those used in normal operation, based on the detected temperature of the power source.

12. The internal combustion engine start controller according to claim 1, further comprising a low temperature detector for detecting a low temperature state of the power source based on a detected temperature of the power source, wherein,
wherein the switching frequency of the first electric power converter and/or the switching frequency of the second power converter are set based on a reference temperature of the low temperature detector.

13. The internal combustion engine start controller according to claim 12, wherein the switching frequency of the first electric power converter and/or the switching frequency of the second power converter are set to the same value as a value during normal operation if the temperature of the power source is equal to or higher than the reference temperature of the low temperature detector.

14. The internal combustion engine start controller according to claim 12, wherein the switching frequency of the first electric power converter and/or the switching frequency of the second power converter are set to a value which is lower than a value during normal operation if the temperature of the power source is lower than the reference temperature of the low temperature detector.

15. The internal combustion engine start controller according to claim 13, wherein the switching frequency of the first electric power converter and/or the switching frequency of the second power converter are set to a value which is lower than a value during normal operation if the temperature of the power source is lower than the reference temperature of the low temperature detector.

* * * * *